(12) United States Patent
Yabutani et al.

(10) Patent No.: US 6,839,696 B1
(45) Date of Patent: Jan. 4, 2005

(54) GUARANTEE CHARGE PROCESSING METHOD AND APPARATUS

(75) Inventors: Takashi Yabutani, Hitachinaka (JP); Minoru Numano, Omiya (JP); Masashi Toyota, Hitachi (JP); Yasuhiro Kiyofuji, Hitachi (JP); Kazuo Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 529 days.

(21) Appl. No.: 09/662,890

(22) Filed: Sep. 15, 2000

(30) Foreign Application Priority Data

Oct. 15, 1999 (JP) .......................................... 11-293504

(51) Int. Cl.⁷ .............................................. G06F 17/60
(52) U.S. Cl. ....................... 705/412; 705/400; 705/428
(58) Field of Search .............................. 705/1, 7, 8, 9, 705/400, 412, 418

(56) References Cited

U.S. PATENT DOCUMENTS 5,818,125 A * 10/1998 Manchester .................. 307/66

FOREIGN PATENT DOCUMENTS

GB 1427755 * 3/1976
JP 03-290784 * 12/1991

OTHER PUBLICATIONS

Luo: "Detection and diagnosis of ffaults and energy monitoring of HVAC systems with least–intrusive power analysis"; vol. 62/05–A of Diessertation Abstracts Internation, p. 1613, (Abstract Only).*

* cited by examiner

Primary Examiner—Edward R. Cosimano
(74) Attorney, Agent, or Firm—Antonelli, Terry, Stout & Kraus, LLP

(57) ABSTRACT

The operation-state data of the uninterruptible power supply unit for the operation time of the uninterruptible power supply unit (UPS) deployed between the load facility and the commercial power source and used for the uninterruptible operation is provided, the guarantee charge dependent on the time during which the operation of the uninterruptible power supply unit is guaranteed is stored, the stored guarantee charge is displayed as the amount billed when the provided operation-state data satisfies the stored guaranteed time.

The provided operation-state data is input into the remote supervisory unit through the communication apparatus as well as an the identical operation-state data is displayed at the data display unit at the uninterruptible power supply unit.

13 Claims, 6 Drawing Sheets

GUARANTEE CHARGE PROCESSING METHOD AND APPARATUS

BACKGROUND OF THE INVENTION

The present invention relates to a charge and billing process method and process apparatus, especially to a charge and billing process method and process apparatus in case that an uninterruptible power supply unit (UPS) is rent to the user and made used with guarantee for the user.

Uninterruptible power supply units are used concomitantly with commercial power sources in the various load facilities such as OA equipment, medical equipment, power distribution equipment for the medical field, amusement facilities, electric power supply facilities to buildings. Those uninterruptible power supply units used concomitantly with commercial power sources are typically owned and installed by the business owner who owns the load facilities.

Uninterruptible power supply units (UPS) are used in order to increase the quality of electric current of the commercial power source and to back up the commercial power source when its service interruption for the load facilities in the factories and offices such as computers and computer servers, which are ordinarily purchased by the user or leased or rent by the user.

In case of purchasing UPS, the initial investment is required to be large, and in case of introducing UPS with lease or rental contract, there are such disadvantages that the rental fee may be high and that USP may not be provided for the long-term service lasting for 10 or 15 years.

The conventional business schemes and their problems are described concretely below according to those examples shown above.

(A) Purchase Scheme and its Problem

In case that the user purchases UPS, the user has to provide the initial investment and bear heavy duty on large amount of investment. A selection of UPS units and an arrangement for field service and maintenance of UPS may arise as duty for the user.

(B) Lease or Rental Schemes and their Problems

In the lease or rental contract of UPS, though the client is not required to provide the initial investment, the annual expenditure may become comparatively higher than the case of purchasing UPS, and there is such a disadvantage that USP may not be provided for the long-term service lasting for 10 or 15 years.

SUMMARY OF THE INVENTION

The present invention is aimed in the light of the problems described above, and an object of the present invention is to provide a method and an apparatus for providing a presenting a concrete scheme, in which the contractor, for example, the user does not need an initial investment, and he or she pays the fee after verifying the guaranteed power supply service of UPS, and for establishing a new power supply guarantee service of USP.

In the present invention, by applying well-known technologies for power supply guarantee services of USP and for collecting the operation-state data of UPS, a contract for power supply guarantee service by USP is defined.

At first, the contractor B (facility manufacturer) as one of the contractors introduces UPS into the facility of the contractor A (user). When UPS is installed between the load facility and the commercial power source, and the power supply guarantee service starts, the UPS operation memory unit is made in service, and the power supply guarantee service record data is collected by the communication means like a telephone line and so on, the guarantee charge is defined based on this record and by referring to a predefined rate, and the charge and billing process is applied to the ser.

When UPS is out of order, the compensation money is determined by referring to a predefined rate, and paid to the user.

When providing this service, needless to say, it is allowed for the service provider to select whether the service provider uses his or her own property for UPS and so on as a component of the power supply guarantee service system, or he or she operates the power supply guarantee service system by introducing the third-party property with a lease contract (for example, finance lease with compulsory purchase condition).

The present invention provides concretely the following method and apparatus.

The present invention provides a guarantee charge processing method, in which the operation-state data of the uninterruptible power supply unit for the operation time of the uninterruptible power supply unit (UPS) deployed between the load facility and the commercial power source and used for the uninterruptible operation is provided, the guarantee charge dependent on the time during which the operation of the uninterruptible power supply unit is guaranteed is stored, the stored guarantee charge is displayed as the amount billed when the provided operation-state data satisfies the stored guaranteed time or conforms to a designated condition with respect to the time.

The present invention provides a guarantee charge processing method, in which the operation-state data of the uninterruptible power supply unit for the operation condition including the operation time of the uninterruptible power supply unit deployed between the load facility and the commercial power source and used for the uninterruptible operation is provided, the guarantee charge dependent on the operation condition of the uninterruptible power supply unit including the time during which the operation of the uninterruptible power supply unit is guaranteed is stored, the stored guarantee charge is displayed as the amount billed when the provided operation-state data satisfies the operation condition including the stored guaranteed time or conforms to a designated condition with respect to the operation condition.

The present invention provides a guarantee charge processing method, in which the provided operation-state data is input into the remote supervisory unit through the communication apparatus, and the identical operation-state data is displayed at the data display unit at the uninterruptible power supply unit.

The present invention further provides a guarantee charge processing method, in which the operation-state data of the uninterruptible power supply unit (UPS) deployed between the load facility and the commercial power source and used for the uninterruptible operation is provided, the guarantee charge with respect to the operation-state of the uninterruptible power supply unit is stored, the provided operation-state data the stored operation-state data of the uninterruptible power supply unit are compared, and then the stored guarantee charge is displayed as the amount billed based on the comparison result.

The present invention further provides a guarantee charge processing method, in which the guarantee charge dependent on the time during which the operation of the uninterruptible power supply unit is guaranteed.

The present invention provides a guarantee charge processing method, in which the operation-state data of the uninterruptible power supply unit for the operation condition including the operation time of the uninterruptible power supply unit deployed between the load facility and the commercial power source and used for the uninterruptible operation is provided, the guarantee charge and the compensation money dependent on the operation condition of the uninterruptible power supply unit including the time during which the operation of the uninterruptible power supply unit is guaranteed is stored, whether the provided operation-state data conforms to a designated condition with respect to the operation condition including the stored guarantee time is judged, and the stored guarantee charge as the amount billed in case of conformance is displayed, and in contrast, the stored compensation money as the demanded compensation money in case of inconformity is displayed.

The present invention further provides a guarantee charge processing method, in which the period during which the operation is guaranteed is a time defined in 24 hours a day.

The present invention provides a guarantee charge processing apparatus comprising a supervisory unit for providing data of the operation-state of the uninterruptible power supply unit deployed between the load facility and the commercial power source and used for the uninterruptible operation; a remote supervisory system for inputting the operation-state data from the supervisory unit; a memory unit for storing the guarantee charge dependent on the operation-state of the uninterruptible power supply unit including the time during which the operation of the uninterruptible power supply unit is guaranteed; a processing unit for comparing the operation-state with the operation condition and processing the stored guarantee charge as the amount billed; and a display unit for displaying the processed amount billed as well as the comparison results.

The present invention provides a guarantee charge processing apparatus; in which said memory unit stores the compensation money, and said processing unit processes the demanded compensation money.

The present invention provides a guarantee charge processing apparatus, in which the stored guarantee charge is determined so as to depend primarily upon the guarantee period for the uninterruptible power supply unit, and secondarily depend upon the time during which the operation of the uninterruptible power supply unit is guaranteed.

DETAILED DESCRIPTION OF THE PREFERRED EMBODIMENTS

One embodiment of the present invention is described below by referring to the attached drawings.

Figure 1:
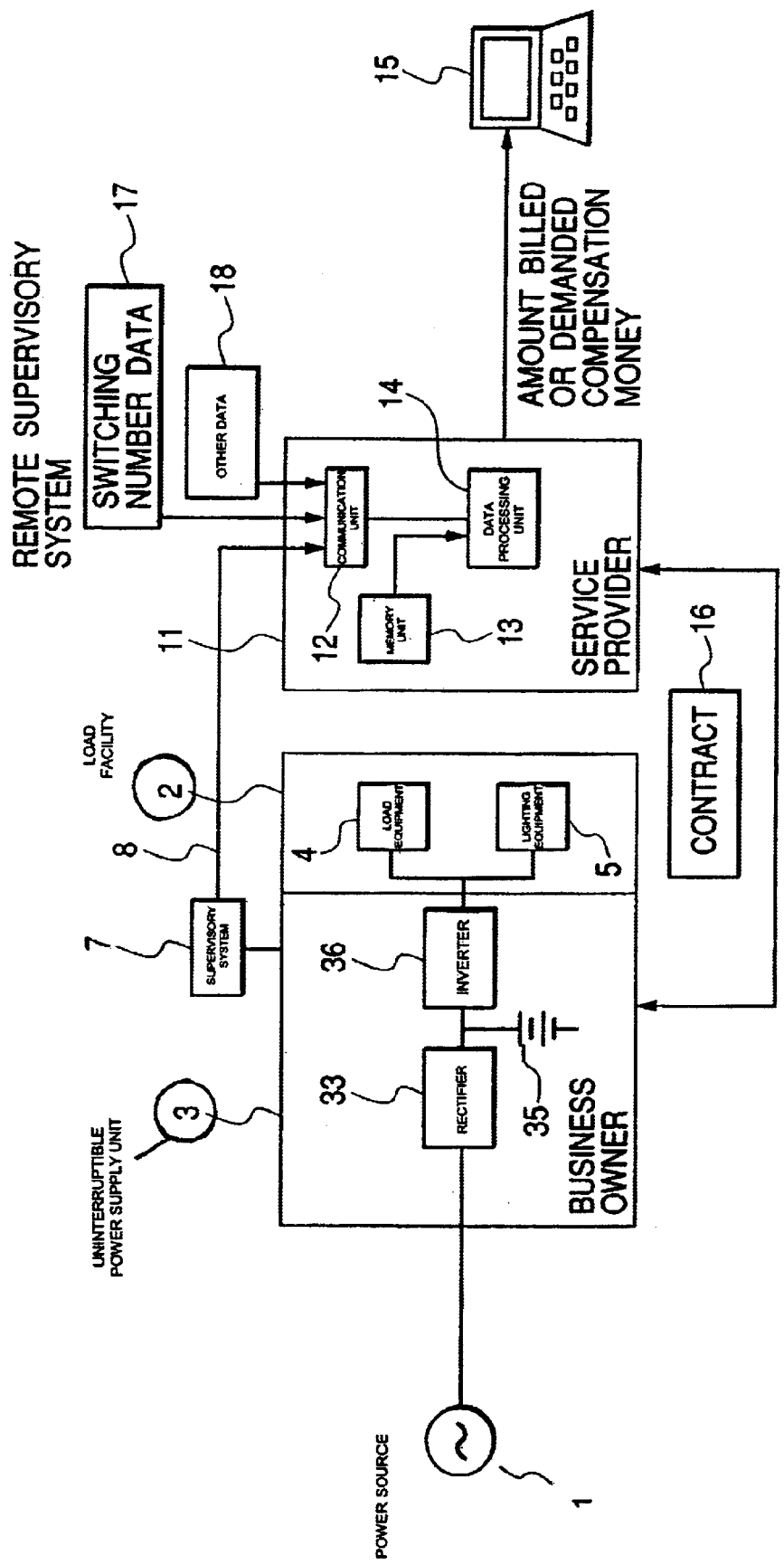
FIG. 1 is a block diagram showing a concept of one embodiment of the present invention.

FIG. 1 is a block diagram showing the concept of one embodiment of the present invention. In FIG. 1, in case that the electric power from the commercial power source 1 is supplied to the load facility 2, the uninterruptible power supply unit 3 to be operated when an interruption of electric power supply occurs due to lightning is installed between the load equipment 4 and the lighting equipment 5. Thus, the electric power is supplied to the load equipment 4 and the lighting equipment 5. The uninterruptible power supply unit 3 is installed in large quantities for the factories, plants and medical fields. The uninterruptible power supply unit 3 is known as an AC power supply equipment which guarantees the continuity of supplying the load electric power by combining a conversion apparatus (for example, rectifier), an energy storage apparatus (for example, secondary battery) and a switch when an interruption of AC electric power supply occurs. The electric power is supplied from the rectifier 33 to the load facility 2 through the inverter in the ordinary operation, and the electric power is supplied from the secondary battery when the interruption of electric power supply occurs. As for the method for connecting the secondary battery, several methods are known which include a floating charging method, a switching method, a chopper method, a PWM inverter method and a multiple inverter method. The installation of the uninterruptible power supply unit 3 is done by the business owner with his or her responsibility conventionally. In this embodiment this uninterruptible power supply unit 3 is installed by the service provider. In this case, the cost for the service provider is collected by the method described later.

The uninterruptible power supply unit has the rectifier 33, the secondary battery 35 and the inverter 36. The supervisory system 7 is attached to the uninterruptible power supply unit 3 in order to observe its operation status including the operation time.

The service provider owns the remote supervisory system 11. The remote supervisory system 11 has a communication unit 12, the memory unit 13 and the data processing unit 14. The observation data sent from the supervisory system 7 through the communication line 8 is supplied to the communication unit 12. The observation data may be provided from the plural uninterruptible power supply units to be used and those UPS's may be controlled in a centralized manner.

A usage contract between the business owner and the service provider is closed in advance before employing the uninterruptible power supply unit 3. When making this contract, in order to organize the charge and billing process for the usage, as described later, at first, what is presented to the business owner is how many hours a day, for example, 24 hours, or from what time to what time in a day the operation of the uninterruptible power supply unit should be guaranteed. Next, the term of contract is presented. For example, 5 years, 10 years or 15 years is adopted for the term of contract. As might be expected, longer the term of contract, higher the charge. The term of contract is called a guarantee period.

The guarantee charge is stored in the memory unit 13 based on the time period (guarantee period) during which the operation of the uninterruptible power supply unit is guaranteed.

There is such a case that the guarantee period is not defined for the reason why the operation of the uninterruptible power supply unit 3 is not required. There is also such a case that the switching operation of the uninterruptible power supply unit 3 may be performed daily or that the uninterruptible power supply unit 3 may break down. The condition defining that the service provider pay the compensate money to the business owner with respect to such unstationary operation-states may be added in the contract 16. The amount of the compensate money is stored in the memory unit 13 in relative to the operation-state. The data 17 regarding to the number of switching operations and other data 18 such as a routine inspection-related data are input to the input apparatus as a part of the supervisory data.

Figure 2:
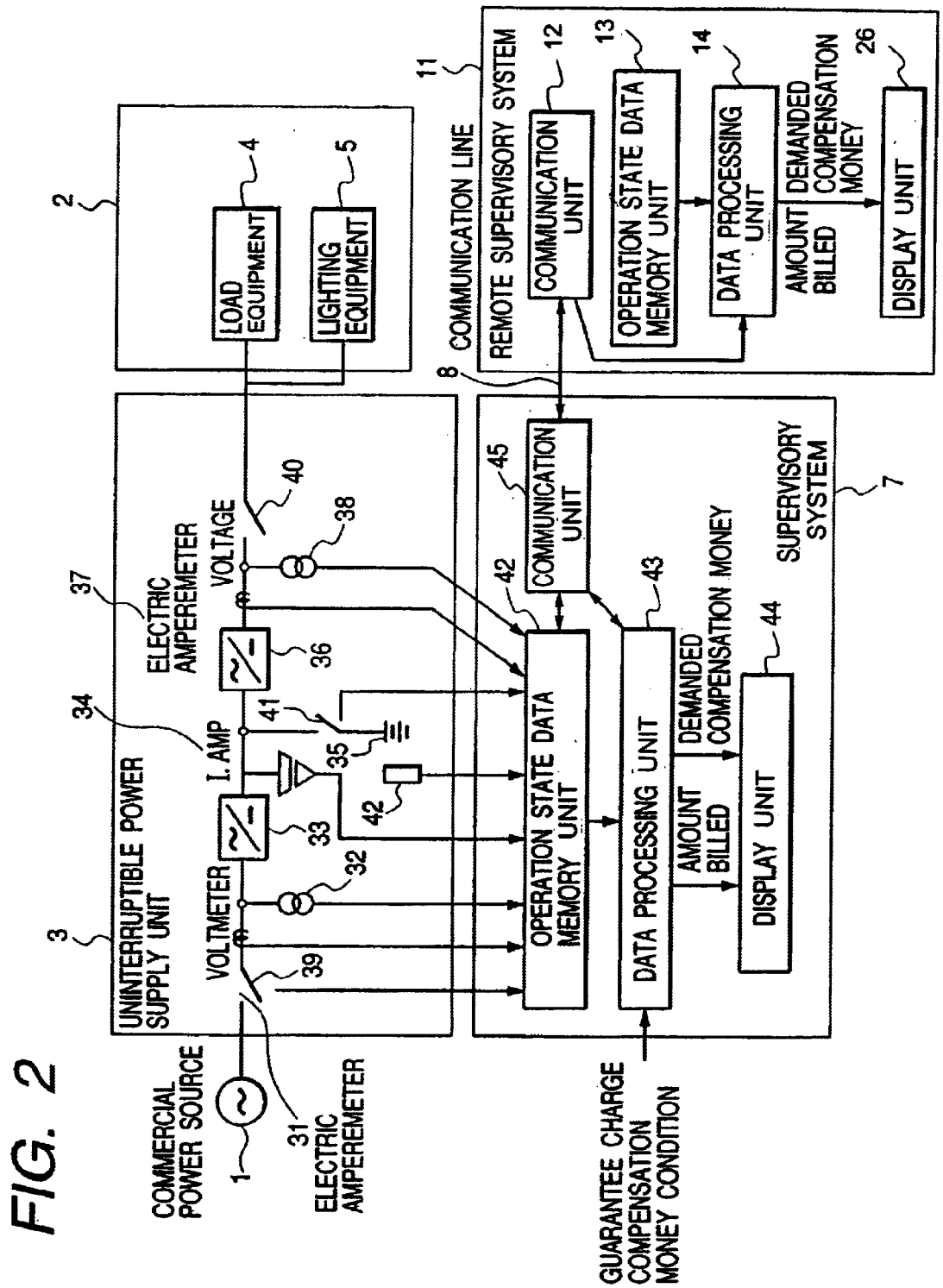
FIG. 2 is a detail view of a part of the embodiment shown in FIG. 1.

FIG. 2 shows a detail and concrete structure of what shown in FIG. 1. In FIG. 2, the uninterruptible power supply unit 3 has the ampere meter CT31, the voltmeter 32, the rectifier 33, the insulating equipment (Isolation AMP) 34, the secondary battery 35, the inverter 36, the ampere meter CT37, and the voltmeter 38, and there are switches 39, 40 and 41 at the connection points to the commercial power source 1, the load facility 2 and the secondary battery 35, respectively. In addition, the temperature sensor 42 is installed. The measurement signals from those instruments and equipment are supplied to the supervisory system 7 and stored in the operation-state data memory unit 42. Those signals are processed by the data processing unit 43 along with the guarantee charge condition, the compensation charge condition stored in another memory unit, and the amount billed and the amount of the demanded compensation money based on the guarantee charge and the compensation money are displayed on the display unit 44. Those stored signals are sent to the remote supervisory system 11 through the communication line 8 by the communication unit 45 (in some cases, along the amount billed and the amount of the demanded compensation money). Those signals are received by the communication unit 12 of the remote supervisory system 11, and stored in the operation-state data memory unit 13, and those signals are processed by the data processing unit 14 along with the guarantee charge condition, the compensation charge condition stored in another memory unit, and the amount billed and the amount of the demanded compensation money based on the guarantee charge and the compensation money are displayed on the display unit 26. Thus, an identical content is displayed on the display unit 44 and 26. Hence, the business owner and the service provider can verify the displayed content individually.

The guarantee charge and the compensation money so stored as described above can be determined by respecting primarily the period of time (guarantee period) covered by the contract for the uninterruptible power supply unit 3, and secondarily the guarantee time.

Figure 3:
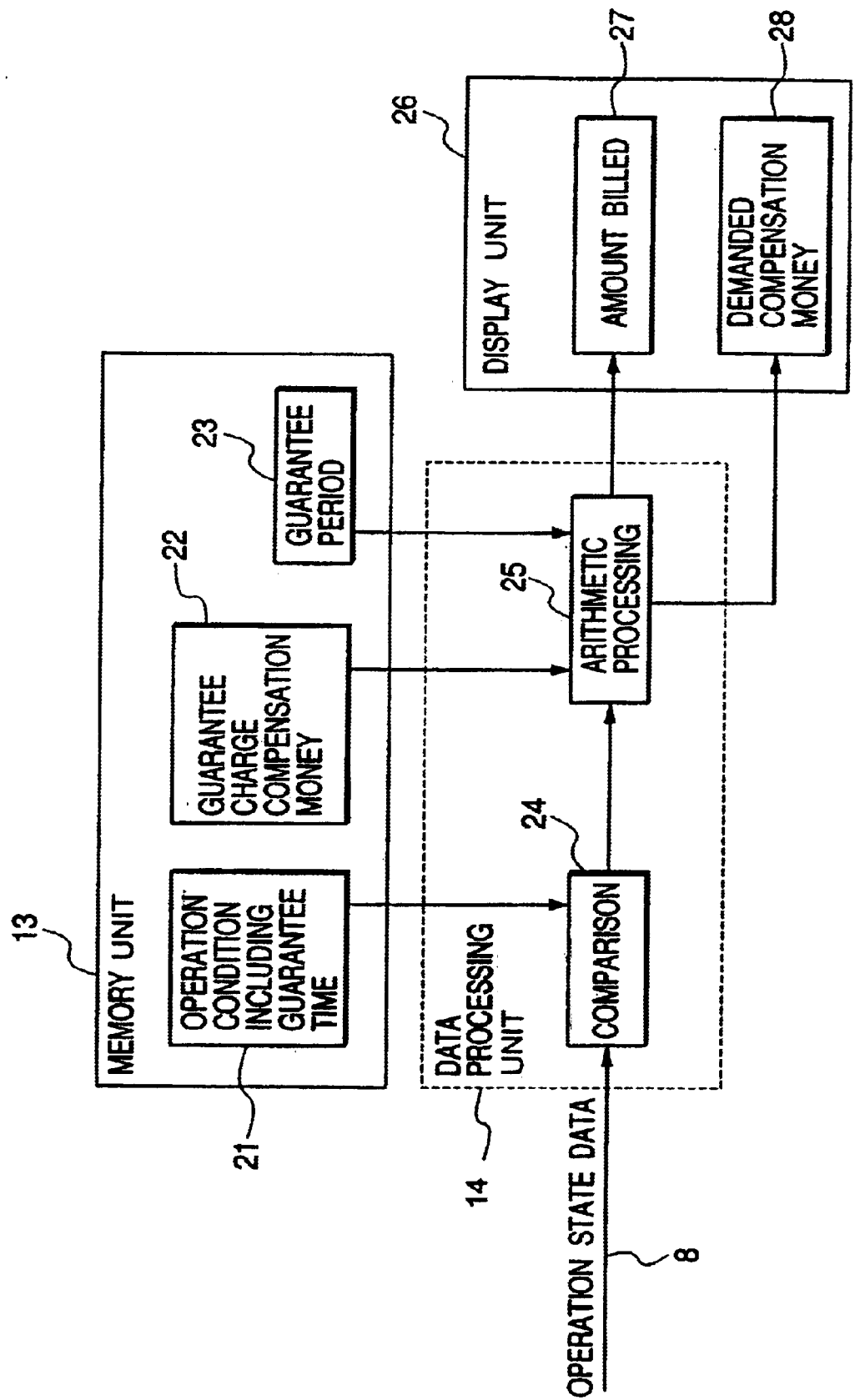
FIG. 3 is a schematic diagram showing a basic concept of the arithmetic processing of the amount billed.

As shown in FIG. 3, whether the operation-state data supplied as the supervisory data satisfies the operation condition including the guarantee time or not is judged by the data processing unit 14. That is, whether the provided operation-state data is conformable to the result of the proper operation including the performance in accordance with the contract condition is judged. In case that this judgment concludes a proper operation, for example, when the provided operation-state data satisfies the guarantee time, the stored guarantee charge is provided and displayed as an amount billed. In case that the operation-state data does not satisfy the stored operation condition, the compensation money is paid as a demanded compensation money from the service provider to the business owner. The amount of money presented as the amount billed or the demanded compensation money depends on the judgment result and the guarantee charge or the compensation money. The amount billed or the demanded compensation money can be provided on CRT 15 (the display unit 26, as shown in FIG. 2) or the printer.

As shown in FIG. 3, the memory unit 13 stores the operation condition 21 including the guarantee time, the guarantee charge and the compensation money 22, and the guarantee period 23 in itself, based on the contract 16 between the business owner and the service provider. The operation-state data is supplied to the data processing unit 14 (as shown in FIG. 1 and FIG. 2) through the communication line 8 once a day, once a week, once a month or hour by hour, and then the comparison and judgment 24 is performed with reference to the operation condition 21 including the guarantee time in order to judge whether the operation-state satisfies the operation condition. If the operation-state data is judged to satisfy the operation condition defined as the result of the proper operation conformable to the contract condition, the arithmetic process 25 is performed corresponding to the guarantee charge 22 during the guarantee period 23, and the amount billed 26 is provided. In case that the operation sate is data is judged not to satisfy the operation condition, the demanded compensation money corresponding to the compensation money is provided by the arithmetic process 25. The amount billed 27 or the demanded compensation money 28 is displayed at the display unit 26, as shown in FIG. 2.

By means of making the financial firm mediate the transfer of the bill and the fee, it is allowed for the financial firm to operate the monthly demand for payment, and for the service provider to receive the lump-sum payment for the usage of the facility from the financial firm.

Figure 4:
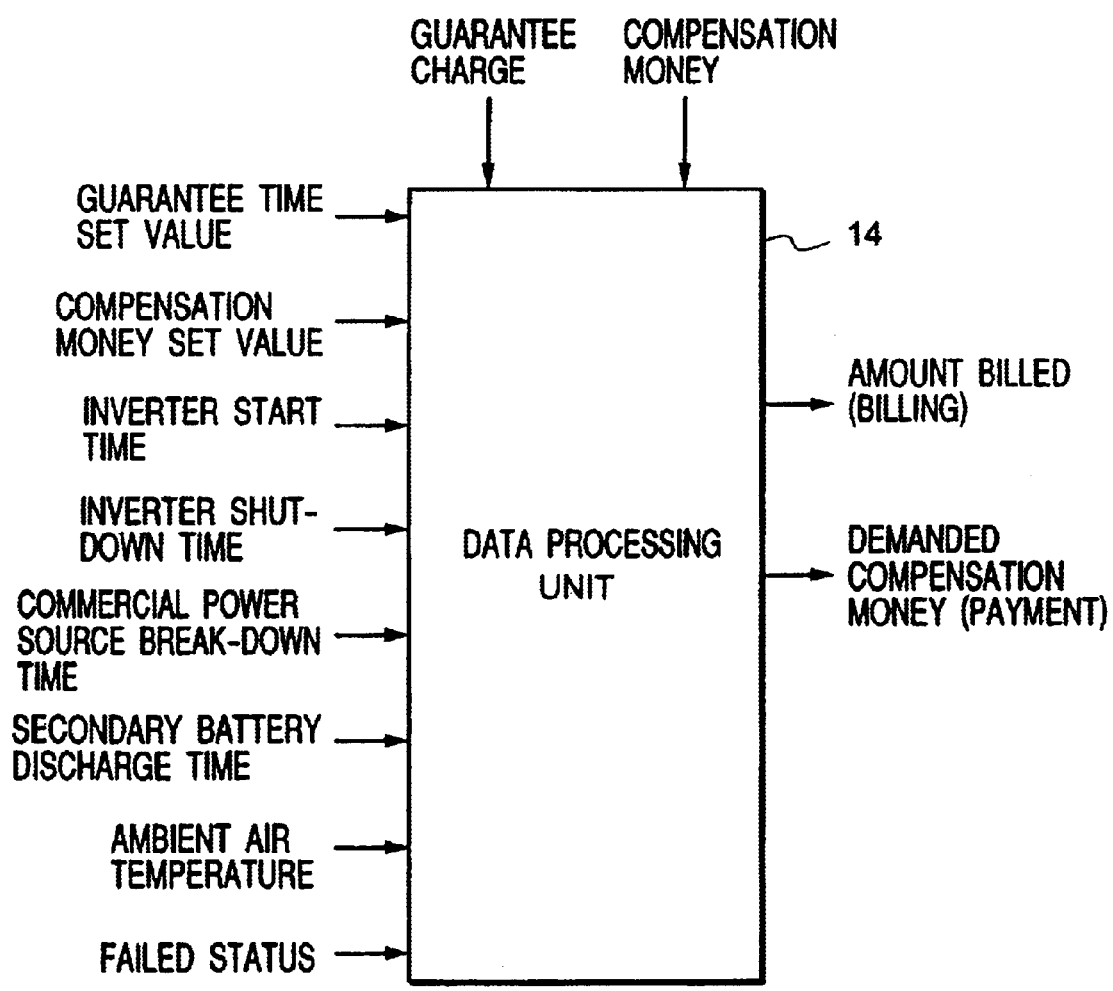
FIG. 4 is a schematic diagram showing an example of the memory content in the memory unit.

FIG. 4 shows an example of the input and output of the data processing unit 14. As shown in FIG. 4, the present value for the guarantee time and the preset value for the compensation money, the inverter start-up time, the inverter shut-down time and the commercial power source breakdown time as the data related to the number of switching operations, and the discharge time for the secondary battery, the ambient air temperature, and the failed state as other data are provide into the data processing unit 14. In addition, the amount of the guarantee charge and the amount of the compensation money are put into the data processing unit 14. The result of data processing is further processed as the amount billed (in billing process) or the demanded compensation money (in payment process), and then provided as output. By referring to the mechanical wear, thermal cycles and discharge cycles (for secondary batteries) and the upper bound of the ambient air temperature, whether severe conditions are applied to the uninterruptible power supply unit is judged.

Figure 5:
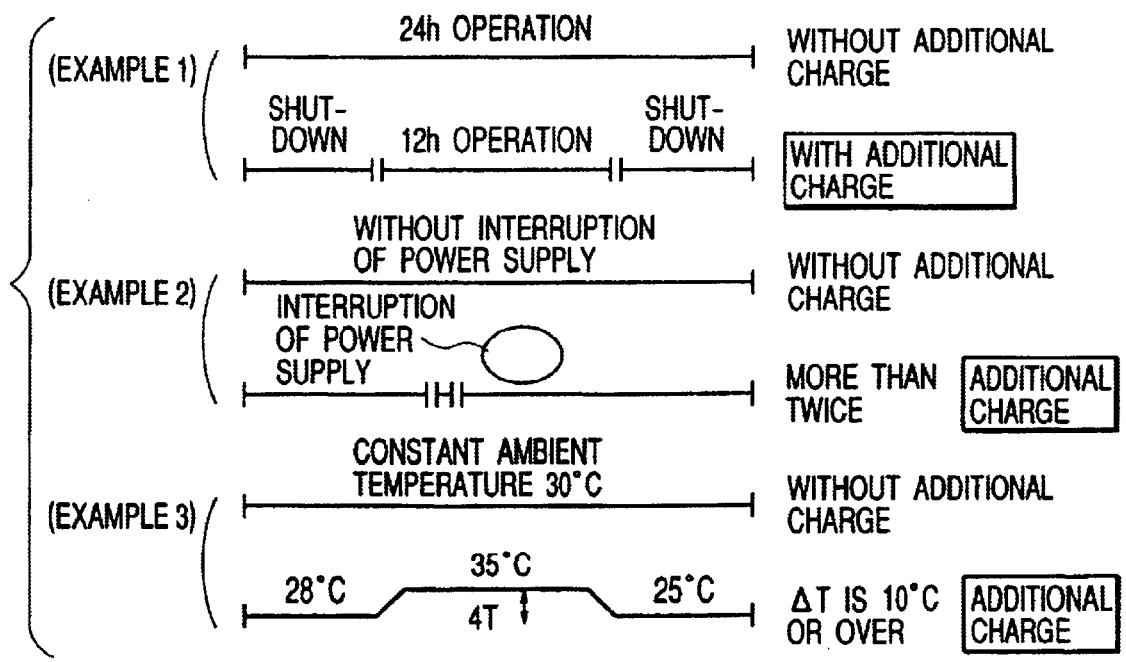
FIG. 5 is a schematic diagram showing an example of the content stored in the memory unit.

FIG. 5 shows an example of the content stored in the memory unit 13. The guarantee charge, the basic guarantee fee and the passive guarantee fee are defined and stored as shown below.

Guarantee Charge=Basic Guarantee Fee+Passive Guarantee Fee,

Basic Guarantee Fee=Charge dependent on the time during which the operation of UPS is guaranteed, and Passive Guarantee Fee=Additional charge in proportion to the degree of the severity of the operation environment for UPS.

As shown in the example 1, in case that the operation continues for 24 hours, the guarantee charge is defined only by the basic guarantee fee without any additional charge, but in case that the operation continues for 12 hours and the shutdown continues for 12 hours, the additional fee is charged.

As shown in the example 2, though the guarantee charge is defined only by the basic guarantee fee without any additional charge in case that there is no interruption of power supply during 24 hours, if there is a chance of the interruption of power supply, the additional fee is charged more than twice a month.

As shown in the example 3, though the guarantee charge is defined by the basic guarantee fee without any additional charge in case that the ambient temperature is constant, for example, 30° C., if the ambient temperature changes for example from 25° C. to 35° C., the additional fee is charged conditionally if the temperature change ΔT is more than 10° C.

Figure 6:
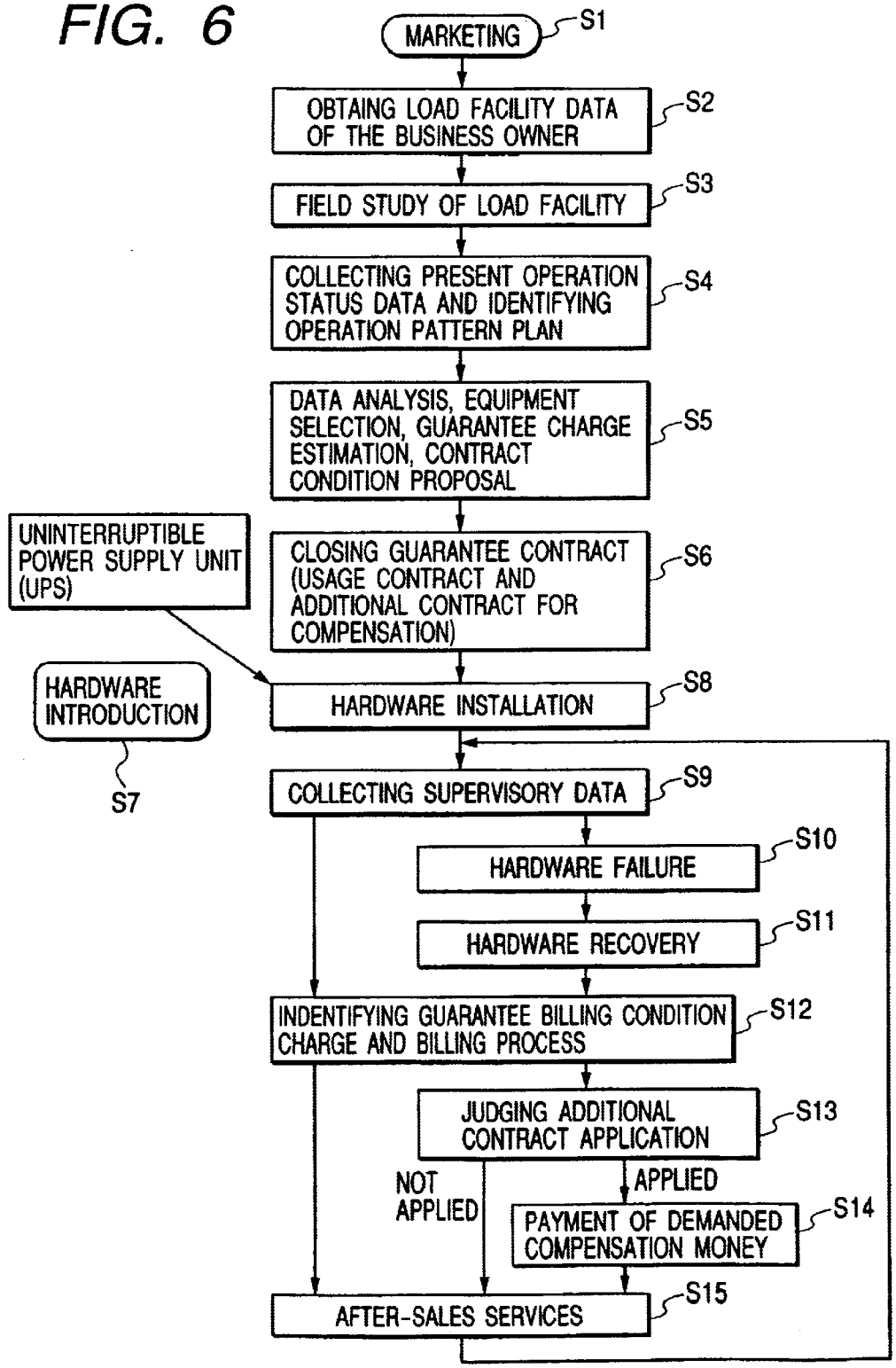
FIG. 6 is a flow chart.

FIG. 6 shows a flow chart for the billing process. The preliminary investigation is performed by marketing (S1), and the data of the load facilities of the business owner is obtained, and then the service contents to be provided from the service provider to the business owner is presented (S2). Next, the field study of the load facilities of the business owner is done (S3). The collection of the operation status data is performed selectively if required, and the identification of the operation pattern plan is necessarily performed (S4). The data collection continues, for example, for one week, and the data analysis, the selection of equipment to be employed, the estimation of the guarantee charge and the presentation of the contract presentation are provided (S5) And then, the guarantee contract is closed (S6), the hardware installation is done (S8) by installing the hardware including uninterruptible power supply units (S7). The supervisory data such as operation-state data is collected by operating the installed hardware (S9). In case that any hardware failure arises (S10), the failed hardware is recovered immediately (S11). The guarantee and billing conditions are identified by the obtained supervisory data, and the amount billed is estimated and the charge and billing process is performed (S12). In case that any hardware failure is arising, whether the supplementary contract for guarantee can be applied is judged (S13), and then, the demanded compensation money is paid (S14). Finally, the after-sales service is provided (S15). In case that hardware failure is not occurred, the processing advances directly to step S12. The guarantee and billing conditions are identified by the supervisory data obtained in normal operation, and the amount billed is estimated and the charge and billing process is performed (S12). In this case, the processing advances directly to step S15 after step S12.

According to the present invention, it will be appreciated that the business owner can use the uninterruptible power supply unit without any initial investment, and that the availability of the uninterruptible power supply unit is guaranteed during the guarantee time in the guarantee period, and the business owner is expected only to pay the usage fee corresponding to the guarantee time, which results in the efficient operation of the facilities and equipment.

As described above, the merits for the business owner include the following items.
(1) The business owner does not need any initial investment.
(2) The business owner can use the uninterruptible power supply unit for a long period of time such as 10 or 15 years.
(3) The business owner can make the operation and management of the uninterruptible power supply unit easier and reduce its management cost by deploying the remote system.

On the other hand, the merits for the service provider include the following items.
(4) The service provider can create new markets for the UPS business.
(5) The service provider can obtain the commercial profit and reduce the cost.

Those merits can be attained by enabling the charge and billing process with the guarantee charge defined by the fact that the availability of the electric power source is guaranteed by collecting and processing statistically the operation status data.

What is claimed is:

1. A guarantee charge processing method comprising:
   providing operation-state data of an uninterruptible power supply (UPS) unit for an operation time of the uninterruptible power supply (UPS) unit deployed between a load facility and a commercial power source and used for an uninterruptible operation;
   storing a guarantee charge dependent on a time during which an operation of the uninterruptible power supply (UPS) unit is guaranteed; and
   displaying the stored guarantee charge as an amount billed when the provided operation-state data conforms to a designated condition with respect to the stored guaranteed time.

2. A guarantee charge processing method comprising:
   providing operation-state data of an uninterruptible power supply (UPS) unit for an operation condition including an operation time of the uninterruptible power supply (UPS) unit deployed between a load facility and a commercial power source and used for an uninterruptible operation;
   storing a guarantee charge dependent on an operation condition of the uninterruptible power supply (UPS) unit including a time during which an operation of the uninterruptible power supply (UPS) unit is guaranteed; and
   displaying the stored guarantee charge as an amount billed when the provided operation-state data conforms to a designated condition with respect to an operation condition including the stored guaranteed time.

3. A guarantee charge processing method as claimed in claim 1 or claim 2, wherein the provided operation data is input into a remote supervisory system through a communication unit, and identical operation-state data is displayed at a data display unit at the uninterruptible power supply (UPS) unit.

4. A guarantee charge processing method comprising:
   providing operation-state data of an uninterruptible power supply (UPS) unit deployed between a load facility and a commercial power source and used for an uninterruptible operation;
   storing a guarantee charge with respect to an operation-state of the uninterruptible power supply (UPS) unit;
   comparing the provided operation-state data with a stored operation-state data of the uninterruptible power supply (UPS) unit; and
   displaying the stored guarantee charge as an amount billed based on the comparison result.

5. A guarantee charge processing method as claimed in claim 4, further storing a guarantee charge dependent on a time during which an operation of the uninterruptible power supply unit is guaranteed.

6. A guarantee charge processing method comprising:
   providing operation-state data of an uninterruptible power supply (UPS) unit for an operation condition including an operation time of the uninterruptible power supply (UPS) unit deployed between a load facility and a commercial power source and used for an un interruptible operation;
   storing a guarantee charge and a compensation money dependent on the operation condition of the uninterruptible power supply (UPS) unit including a time during which an operation of the uninterruptible power supply (UPS) unit is guaranteed;

determining whether the provided operation-state data conforms to a designated condition with respect to the operation condition including the stored guarantee time; and displaying the stored guarantee charge as an amount billed in case of conformance, and displaying the stored compensation money as a demanded compensation money in case of inconformity.

7. A guarantee charge processing method as claimed in either one of claim 1, claim 4 and claim 6, wherein the guarantee charge is composed of a basic guarantee fee which depends primarily upon the guarantee period for the uninterruptible power supply (UPS) unit and a variable guarantee fee which depend upon the time during which the operation of the uninterruptible power supply (UPS) unit is guaranteed.

8. A guarantee charge processing apparatus comprising:

a supervisory system for providing data of an operation-state of an uninterruptible power supply (UPS) unit deployed between a load facility and a commercial power source and used for an uninterruptible operation;

a remote supervisory system for inputting operation-state data from the supervisory system;

a memory unit for storing a guarantee charge dependent on an operation condition of the uninterruptible power supply (UPS) unit including a time during which an operation of the uninterruptible power supply (UPS) unit is guaranteed;

a processing unit for comparing the operation-state with said operation condition and processing the stored guarantee charge as an amount billed; and a display unit for displaying the processed amount billed as well as the comparison results.

9. A guarantee charge processing apparatus as claimed in claim 8, wherein said memory unit stores compensation money, and wherein said processing unit processes demanded compensation money.

10. A guarantee charge processing apparatus as claimed in claim 8 or claim 9, wherein the stored guarantee charge is determined so as to depend primarily upon a guarantee period for the uninterruptible power supply (UPS) unit, determined when a usage contract is concluded and determined fixedly, and secondarily depend upon a time during which an operation of the uninterruptible power supply (UPS) unit after the conclusion of the usage contract is guaranteed, determined variably.

11. A guarantee charge processing apparatus as claimed in claim 8, wherein the guarantee charge is composed of a basic guarantee fee which depends primarily upon the guarantee period for the uninterruptible power supply (UPS) unit and a variable guarantee fee which depend upon the time during which the operation of the uninterruptible power supply (UPS) unit is guaranteed.

12. A guarantee charge processing apparatus as claimed in claim 9, wherein the guarantee charge is composed of a basic guarantee fee which depends primarily upon the guarantee period for the uninterruptible power supply (UPS) unit and a variable guarantee fee which depend upon the time during which the operation of the uninterruptible power supply (UPS) unit is guaranteed.

13. A guarantee charge processing apparatus as claimed in claim 10, wherein the guarantee charge is composed of a basic guarantee fee which depends primarily upon the guarantee period for the uninterruptible power supply (UPS) unit and a variable guarantee fee which depend upon the time during which the operation of the uninterruptible power supply (UPS) unit is guaranteed.

* * * * *